United States Patent
Saint-Leger et al.

(10) Patent No.: US 9,643,498 B2
(45) Date of Patent: May 9, 2017

(54) METHOD FOR RECHARGING A PAIR OF VEHICLE BATTERIES OF DIFFERENT NOMINAL VOLTAGES, AND ASSOCIATED SYSTEM

(75) Inventors: Gerard Saint-Leger, Versailles (FR); Dino Bouillon, Savigny-sur-Orge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 284 days.

(21) Appl. No.: 14/119,734

(22) PCT Filed: May 15, 2012

(86) PCT No.: PCT/FR2012/051081
§ 371 (c)(1),
(2), (4) Date: Mar. 12, 2014

(87) PCT Pub. No.: WO2012/160292
PCT Pub. Date: Nov. 29, 2012

(65) Prior Publication Data
US 2014/0184153 A1    Jul. 3, 2014

(30) Foreign Application Priority Data
May 23, 2011    (FR) .................................. 11 54468

(51) Int. Cl.
*B60L 11/18*    (2006.01)
*H02J 7/00*    (2006.01)
(Continued)

(52) U.S. Cl.
CPC .......... *B60L 11/1801* (2013.01); *B60L 1/003* (2013.01); *B60L 1/08* (2013.01); *B60L 7/14* (2013.01);
(Continued)

(58) Field of Classification Search
CPC .................................................. B60L 11/1801
(Continued)

(56) References Cited

U.S. PATENT DOCUMENTS 6,232,674 B1 * 5/2001 Frey ...................... H02J 7/1423
307/10.1
6,668,954 B2 * 12/2003 Field ........................ B60K 6/40
180/65.23

(Continued)

FOREIGN PATENT DOCUMENTS

| EP | 1 595 748 | 11/2005 |
|---|---|---|
| JP | 2002-112406 | 4/2002 |
| JP | 2011-10501 | 1/2011 |

OTHER PUBLICATIONS

French Search Report Issued Mar. 14, 2012 in Application No. 1154468 Filed May 23, 2011.
(Continued)

*Primary Examiner* — Samuel Berhanu
*Assistant Examiner* — Tessema Kebede
(74) *Attorney, Agent, or Firm* — Oblon, McClelland, Maier & Neustadt, L.L.P.

(57) ABSTRACT

A system supplying electrical power to a vehicle including: a network of electricity consuming units; a first electrical accumulation battery connected to the network, exhibiting a first maximum voltage when unloaded less than a maximum network voltage; a second electrical accumulation battery connected to the network, exhibiting a second maximum voltage when unloaded greater than the maximum voltage when unloaded of the first battery, and a minimum acceptable voltage when unloaded below the maximum network voltage; a drivable alternator connected to the network, configured to deliver to the second battery an electrical energy under a setpoint voltage drivable to various setpoint values; an electronic management facility, configured to (Continued)

Figure 1:
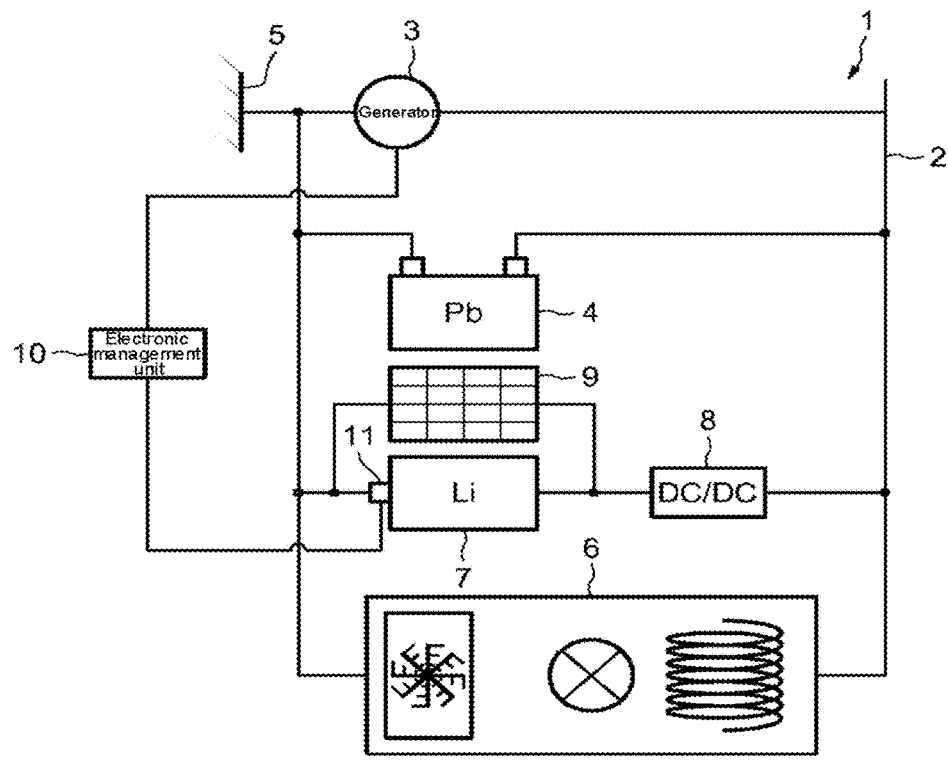

impose at least two different setpoint voltages successively on the alternator when the vehicle is running, a low alternator voltage greater than the first maximum voltage, and a high alternator voltage greater both than the minimum voltage and than the low alternator voltage.

14 Claims, 2 Drawing Sheets

(51) Int. Cl.
    *H02J 7/14* (2006.01)
    *B60L 1/00* (2006.01)
    *B60L 1/08* (2006.01)
    *B60L 7/14* (2006.01)
    *B60L 11/14* (2006.01)

(52) U.S. Cl.
    CPC .......... *B60L 11/14* (2013.01); *B60L 11/1861* (2013.01); *B60L 11/1868* (2013.01); *B60L 11/1875* (2013.01); *H02J 7/00* (2013.01); *H02J 7/0013* (2013.01); *H02J 7/0022* (2013.01); *H02J 7/0024* (2013.01); *H02J 7/14* (2013.01); *H02J 7/1423* (2013.01); *B60L 2210/10* (2013.01); *B60L 2210/30* (2013.01); *B60L 2210/40* (2013.01); *B60L 2240/547* (2013.01); *B60L 2240/80* (2013.01); *B60L 2250/10* (2013.01); *Y02T 10/70* (2013.01); *Y02T 10/7005* (2013.01); *Y02T 10/7011* (2013.01); *Y02T 10/7016* (2013.01); *Y02T 10/7044* (2013.01); *Y02T 10/7055* (2013.01); *Y02T 10/7066* (2013.01); *Y02T 10/7077* (2013.01); *Y02T 10/7216* (2013.01); *Y02T 10/7241* (2013.01)

(58) Field of Classification Search
    USPC ......................................................... 320/108
    See application file for complete search history.

(56) References Cited

U.S. PATENT DOCUMENTS

| | | | |
|---|---|---|---|
| 7,506,182 B2* | 3/2009 | Taniguchi | B60L 7/10 307/10.6 |
| 2004/0201365 A1* | 10/2004 | Dasgupta | B60L 11/1809 320/116 |
| 2006/0097577 A1* | 5/2006 | Kato | F02N 11/0866 307/10.1 |
| 2006/0108954 A1* | 5/2006 | Sebille | H02J 7/1423 318/108 |
| 2008/0111508 A1 | 5/2008 | Dasgupta et al. | |
| 2008/0215199 A1 | 9/2008 | Aoyama et al. | |
| 2009/0206660 A1* | 8/2009 | Makita | H02J 7/1423 307/9.1 |
| 2010/0125383 A1* | 5/2010 | Caouette | B63H 21/17 701/21 |
| 2011/0001352 A1* | 1/2011 | Tamura | B60R 16/033 307/9.1 |

OTHER PUBLICATIONS

International Search Report Issued Dec. 18, 2012 in PCT/FR12/051081 Filed May 15, 2012.
Office Action issued Feb. 9, 2016 in Japanese Patent Application No. 2014-511931.
Office Action issued Sep. 27, 2016 in Japanese Patent Application No. 2014-511931.

* cited by examiner

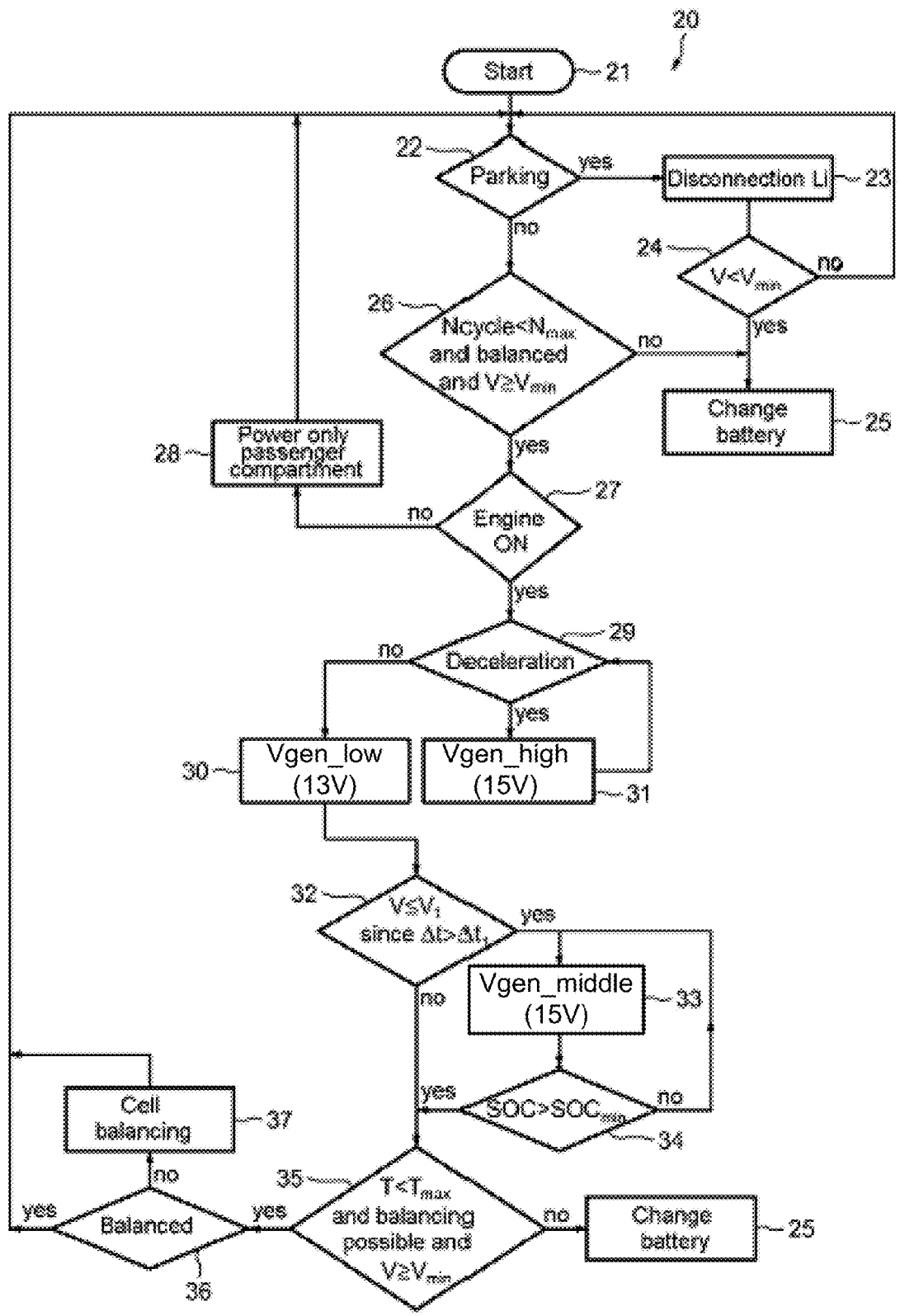

METHOD FOR RECHARGING A PAIR OF VEHICLE BATTERIES OF DIFFERENT NOMINAL VOLTAGES, AND ASSOCIATED SYSTEM

The invention relates to electrical power supply systems in motor vehicles driven by heat engines or hybrid thermal/electric vehicle propulsion, and in particular to electrical power supply systems having several different types of batteries.

Indeed, different types of batteries can be used in parallel to take advantage, for example, of the ability of a lead battery to provide power for a cold start, and of the high specific energy and greater endurance in terms of charge/discharge cycles of a lithium-ion battery.

Patent application US 2011 00 1352 describes a system incorporating both types of battery, the no-load voltages and the internal resistance of the two batteries being selected such that, for a constant generator voltage, it is preferably the lithium battery that discharges then recharges, the lead battery thus undergoing fewer charge/discharge cycles.

Use of the lead battery is then preferably reserved for the vehicle starting phases.

To enable such an arrangement, the maximum no-load voltage of the lithium battery must remain relatively close to the maximum no-load voltage of the lead battery, thereby limiting the maximum energy capacity of the lithium battery.

Such a system makes it possible to increase the lifetime of the lead battery, but necessarily limits the performance of the lithium batteries used. Furthermore, the constant voltage from the generator must be set sufficiently high to enable the lead battery and the lithium battery to be recharged simultaneously, which leads to greater fuel consumption compared to a system incorporating a lead battery only.

The invention is intended to propose an electrical power supply system for a vehicle incorporating two batteries, this system enabling not only the lifetime of the lead battery to be increased, but also the average fuel consumption of the vehicle to be reduced.

For this purpose, an electrical power supply system of a vehicle includes:
- a direct-current network, of at least one electrically powered device, that can be powered by a range of voltages not exceeding a maximum network voltage,
- a first electrical accumulation battery connected to the network, and having a first maximum no-load voltage that is less than the maximum network voltage,
- a second electrical accumulation battery connected to the network, having a second maximum no-load voltage that is greater than the maximum no-load voltage of the first battery, and an acceptable minimum no-load voltage that is less than the maximum network voltage,
- an adjustable generator connected to the network that is able to supply electrical energy to the second battery below a setpoint voltage adjustable to different setpoint values.

The system also includes an electronic management unit, configured to set the generator, when the vehicle is being driven, successively to at least two different setpoint voltages, specifically a low generator voltage that is necessarily greater than the first maximum no-load voltage of the first battery, and a high generator voltage that is necessarily higher both than the minimum no-load voltage of the second battery and the low generator voltage. According to certain alternative embodiments, the generator may be a generator system comprising a generator combined with a direct-current/direct-current (DC/DC) converter. In this case, the voltage of the generator itself becomes adjustable. According to another embodiment, the setpoint voltage may be adjustable by modifying only the setpoint of the DC/DC transformer, with the voltage of the generator not being adjustable. According to another embodiment, the setpoint voltage may be adjustable by modifying both the voltage supplied by the generator and the setpoint of the DC/DC transformer.

According to an improved embodiment, the system also includes a DC/DC voltage transformer able to lower the voltage supplied by the second battery to the network. The second full-charge operating voltage of the second battery can then be greater than the maximum network voltage.

Advantageously, the voltage transformer is bi-directional and able to power the second battery at a voltage greater than the maximum network voltage when the generator is supplying a current beneath the high generator voltage.

The first battery may be a lead battery and the second battery may be a lithium battery, in particular a lithium-ion battery. The second battery may also be a conventional, reinforced or valve-regulated lead-acid (VRLA) battery having characteristics different to the first battery.

The electronic management unit may be configured to open a switch of the second battery when the vehicle is in parking mode, i.e. the engine is stopped, and may be configured, if the voltage of the first battery drops beneath a first threshold and simultaneously the voltage of the second battery is above a second threshold, to close this switch for a predetermined period of time before the vehicle is next started. This predetermined period of time enables the first battery to be partially recharged.

According to another aspect, in a management method of a motor vehicle fitted with a first battery and a second battery supplying electrical energy, the two batteries having different maximum no-load voltages and being connected to a single generator and to a single direct-current electrical network of the vehicle, a low generator voltage is set for the initial vehicle driving phases, and a high generator voltage that is higher than the low generator voltage is set for the subsequent vehicle driving phases, such as the regenerative braking phases, which consume less fuel than the initial phases. The initial driving phases correspond to driving phases with no deceleration. Advantageously, this method can be applied to a motor vehicle in which the first battery, the second battery and the generator are connected in parallel.

Preferably, the high generator voltage is set when the vehicle is in a regenerative deceleration phase, and the low generator voltage is set when the vehicle is in an engine acceleration phase.

An intermediate generator voltage, necessarily greater than the low generator voltage and less than or equal to the high generator voltage, may be set when a charge level of the second battery drops below a threshold charge, and/or when a specific driving mode of the vehicle other than deceleration is detected, and/or if the current supplied by the second battery to the network passes a given threshold. The intermediate voltage level of the alternator may be different for the different cases cited.

For example, the second battery may be powered using a DC/DC transformer by bringing the voltage at the terminals of the battery to a value of between 15 V and 17 V during the regenerative deceleration phases of the vehicle.

The system may include on-board solar panels on the vehicle that are connected to the network.

The system may also include an electrical connection suitable for recharging the second battery from a network outside the vehicle.

According to a preferred embodiment, the second battery may be a reconditioned lithium battery previously used to provide power for motor vehicle propulsion. Typically, the second lithium battery is made up of two (used) modules of an electric-vehicle traction battery, i.e. having a state of charge between 70% and 80% of the initial capacity thereof. The system according to the invention uses these modules in a voltage range corresponding to a state of charge of between 5% and 30% of the initial capacity thereof. To ensure these modules are not discharged below the usable state of charge thereof, a switch is placed between the lithium battery and the rest of the system, this switch being opened when the state of charge of the battery reaches 5% and it is no longer recharged by the system according to the invention, therefore typically in parking mode, i.e. when the motor of the vehicle is stopped.

The electronic management module may for example be configured to set a low generator voltage that is less than or equal to 1.05 times the maximum no-load voltage of the first battery, or less than 1.035 times the maximum no-load voltage of the first battery.

The low generator voltage may for example be between 12.8 and 13.5 V and the high generator voltage may be between 14 and 15 V.

According to an advantageous embodiment, the second battery may be powered using a DC/DC transformer by bringing the voltage at the terminals of the battery to a value of between 15 V and 17 V during the regenerative deceleration phases of the vehicle.

Figure 2:
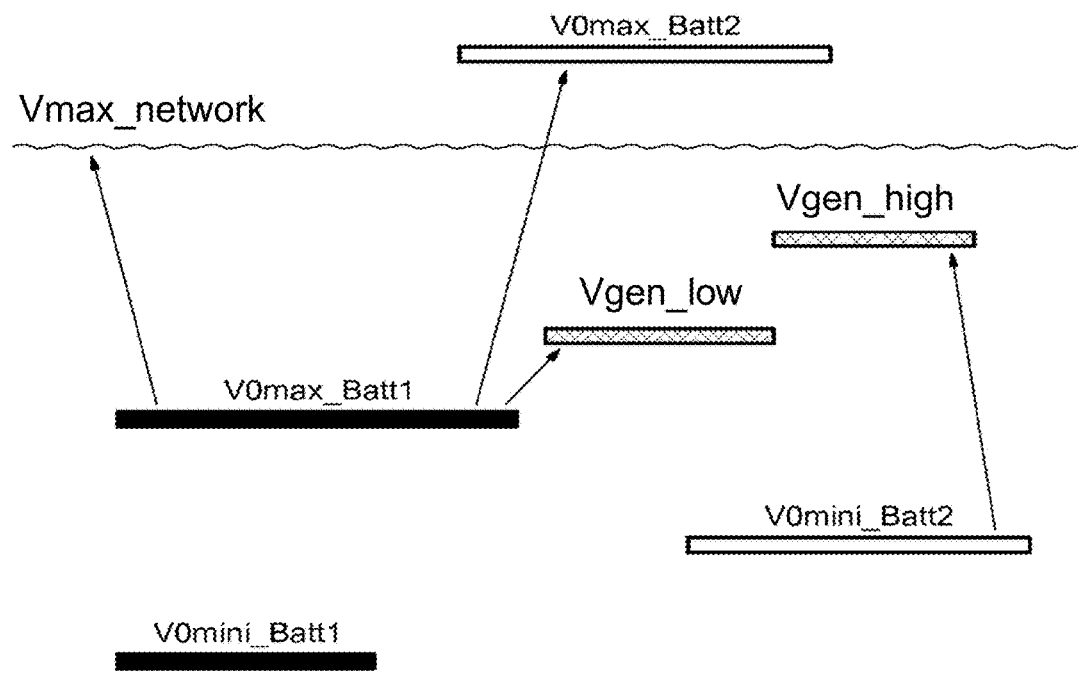

Other objectives, features and advantages of the invention are set out in the description below, given purely by way of non-limiting example and in reference to the attached drawings, in which:

FIG. 1 is a schematic representation of a power supply system according to the invention, FIG. 2 is a graph showing the relative levels of different voltages involved in operation of the power supply system in FIG. 1, FIG. 3 is an algorithm showing a possible management mode of the power supply system in FIG. 1.

As shown in FIG. 1, an electrical power supply system of a vehicle includes an electrical network 2, a generator 3, a first battery 4, for example a lead battery, a second battery 7, for example a lithium-ion battery, and an electronic management unit 10. The second battery 7 is fitted with a switch 11 enabling the network 2 to be disconnected. The alternator 3 is able to convert the mechanical energy drawn from the shaft connected to a heat engine (not shown) into electrical energy sent over the electrical network 2.

Electrically powered devices 6 such as air-conditioning devices, lighting means and heating means are arranged on the electrical network 2. The generator 3 is connected to the terminals of the first battery 4. The second battery 7 is connected in parallel to the first battery 4. The electrically powered devices 6 are connected in parallel on the network 2. The network 2 includes a connection to ground 5 on the chassis of the vehicle. The network 2 also powers a starter able to start the heat engine of the vehicle to initiate the first combustion cycle.

According to the alternative embodiments, the second battery 7 may be connected to a DC/DC transformer 8 connected in series to the battery 7, such that the voltage at the terminals of the second battery 7 can be higher than the maximum network voltage 2.

In the alternative embodiments in which the second battery 7 is associated to a DC/DC transformer 8, energy generation means such as solar panels 9 may be connected to the terminals of the second battery 7, which enables the maximum voltage supplied by these solar panels 9 to be greater than the maximum network voltage 2.

The electronic management unit is connected to the generator 3, for which it is able to set a variable setpoint voltage and in particular for which it is able to set two different setpoint values, a first value Vgen_low and a second value Vgen_high that is higher than the first value.

The electronic management unit 10 is also connected to the switch 11, which may be a mechanical electromagnetic switch or an electronic switch, for example a transistor. By opening the switch 11, the electronic management unit 10 can disconnect the second battery 7 from the network and prevent untimely discharging of this second battery 7.

The first battery, in particular if the first battery is a lead battery, may be used preferably when starting the heat engine of the vehicle to power a starter motor. The electronic management unit 10 disconnects the second battery 7 (for example a lithium battery, and more specifically a lithium-ion battery) using the switch 11 once the vehicle is in "parking" mode. This prevents the battery 7 from discharging. The second battery 7 then remains disconnected from the network until the next time the engine of the vehicle is started.

Since lead batteries have an excellent cold starting capacity, the first lead battery 4 is used when starting the heat engine of the vehicle.

Lithium batteries have better endurance in terms of cycles, and therefore the second battery is used to power the on-board network of the vehicle when the vehicle is being driven. The voltage of the network, i.e. the measurable voltage between the terminals of the first battery 4, is determined by whichever of the three following elements has the highest voltage between the two terminals thereof: the generator 3, the first battery 4 and the second battery 7, which may be associated with a DC/DC transformer.

The "terminals" of each of the elements means the two connection points of this element to the network 2.

If the system includes a DC/DC transformer 8, connected as described in FIG. 1, the voltage at the terminals of the unit [second battery 7, DC/DC transformer 8] refers to the voltage between the two connection points of this unit to the network 2.

When the generator 3 is not turning, for example when the vehicle is being started, and the second battery 7 is disconnected by the switch 11, it is the first battery 4 that determines the voltage on the network 2.

When the vehicle is being driven and the generator 3 is working, the setpoint voltage of the generator 3 is set to above the maximum no-load voltage of the first battery 4. This means that the first battery 4 is not supplying the electrical energy of the circuit 2. Depending on whether the voltage of the generator 3 is higher or lower than the voltage of the second battery 7, it is either the generator 3 or the second battery 7, or both simultaneously, that supply the electrical power of the network 2.

Within the scope of the invention, a second battery 7 is chosen with a maximum no-load voltage that is sufficiently greater than the maximum no-load voltage of the first battery 4 so that two operating modes can be selected alternately.

In the first operating mode, the generator voltage is set at a low value "Vgen_low" that is greater than the maximum no-load voltage of the first battery "V0max_batt1", which is itself less than the maximum voltage permitted by the network "Vmax_network".

The generator voltage "Vgen_low" is less than the maximum no-load voltage of the second battery 7 "V0max_batt2". In a second operating mode, the generator voltage is equal to a high alternator voltage value "Vgen_high", which is greater than the low alternator voltage and less than the maximum voltage tolerated by the network.

Thus, when the generator 3 is set to supply the low generator voltage and the second battery 7 is sufficiently charged such that the voltage thereof is greater than the low generator voltage, the second battery 7 is used to supply electrical power to the network 2. In this operating mode, when the operating voltage of the second battery 7 drops to the level of the low alternator voltage, some of the electrical power of the network 2 is supplied by the second battery 7 and some of the electrical power is supplied by the generator 3.

When the electronic management unit 10 activates the second operating mode, in which the high generator voltage is applied, if the no-load voltage of the second battery is less than the high generator voltage, the generator is used to supply electrical energy to the network and simultaneously to supply energy to recharge the second battery 7.

If the generator 3 is the only means provided to recharge the second battery 7, the second battery 7 may then be recharged during phases in which the high generator voltage is applied, and it may provide the energy to the network as long as the voltage thereof remains above the low generator voltage, during the phases in which the electronic management unit 10 applies the low generator voltage.

A low generator voltage just greater than the maximum no-load voltage of the first battery is preferably applied such that, during the phases in which the low generator voltage is applied, the generator draws as little mechanical energy as possible from the drive shaft driven by the heat engine. Consequently, the generator only slightly increases fuel consumption, while ensuring that the first battery remains fully charged at all times.

In the first operating mode, if the second battery 7 is sufficiently charged (i.e. if the voltage thereof is greater than the low generator voltage) it is the second battery 7 that supplies electrical energy to the network 2.

The phases in which the high generator voltage is applied to recharge the second battery 7 are preferably low-fuel-consumption driving phases, for example regenerative deceleration phases, i.e. if the vehicle is in a deceleration mode enabling use of engine braking and some of the mechanical energy of the drive shaft to turn the generator. For this purpose, for example the setpoint at the pedal of the vehicle need simply correspond to an engine deceleration phase.

Some of the kinetic braking energy of the vehicle is then used to recharge the second battery 7. This energy recovered during the braking phases helps to save fuel by limiting the generator voltage set during the driving phases corresponding to the first operating mode.

FIG. 2 shows an example of the relative positioning of the different voltage values mentioned above in the description of the electrical power supply system 1.

The different levels shown in FIG. 2 show the minimum no-load voltage of the first battery 4, i.e. V0mini_batt1, the maximum no-load voltage of the first battery 4, i.e. V0max_batt1, the minimum no-load voltage V0mini_batt2 of the second battery 7, the maximum no-load voltage V0max_batt2 of the second battery, the low generator voltage Vgen_low, the high generator voltage Vgen_high and the maximum voltage Vmax_réseau that the network 2 is able to withstand without being damaged.

Typically, when operating with a lead battery as the first battery 4 and a recovered lithium-ion battery previously used for the propulsion of electric or hybrid vehicles as the second battery, the minimum no-load voltage V0mini_batt1 of the first lead battery is around 12 volts, and corresponds substantially to (or is slightly less than) the minimum no-load voltage V0mini_batt2 of the second lithium battery.

The maximum no-load voltage V0max_batt1 of the first lead battery is around 12.8 volts, and the low generator voltage Vgen_low set to be just above this maximum no-load voltage is around 13.2 volts.

The maximum no-load voltage V0max_batt2 of the second lithium battery may be around 16.8 volts, and the high generator voltage Vgen_high around 15 volts in order to remain below the maximum value accepted by the network Vmax_réseau, which is around 16 volts.

It is possible to use other types of battery for the first and for the second batteries, and the maximum voltage of the second battery need not necessarily be greater than the maximum voltage of the network. The low generator voltage must preferably be greater than the maximum no-load voltage of the first battery. There could potentially be an embodiment in which the low generator voltage is very slightly less than the maximum no-load voltage of the first battery, but in this case unnecessary charging/discharging cycles would be applied to the first battery, thereby reducing the lifetime thereof.

The maximum voltage of the second battery must necessarily be greater than the maximum no-load voltage of the first battery, to make it possible to define a low generator voltage value between these two maximum no-load voltage values of the two batteries.

The high generator voltage may be equal to or greater than the maximum no-load voltage of the second battery, for example if the maximum voltage of the second battery is less than the maximum voltage tolerated by the network.

The minimum no-load voltage of the second battery must be less than the high generator voltage to enable an at least partial charge of the second battery 7 during the operating phases with the high generator voltage.

The second battery 7 may be recharged, in addition to during the phases in which the generator is turning at the high voltage value thereof, by additional electricity generation means such as solar panels 9. If the maximum no-load voltage of the second battery is less than the maximum voltage tolerated by the network, or if the system includes a DC/DC transformer able to lower the voltage supplied by the second battery to a voltage lower than the maximum voltage tolerated by the network, it could also be possible to recharge the second battery 7 from a network outside the vehicle, for example in a car park.

The maximum no-load voltage of the second battery 7, i.e. V0max_batt2, may be less than or greater than the maximum voltage accepted by the network 2. If the maximum no-load voltage of the second battery is greater than the maximum voltage accepted by the network Vmax_réseau, according to a first embodiment, only some of the operating range of the second battery is used, for example between the low generator voltage and the high generator voltage.

According to a second operating variant, the second battery 7 may be used in a wider range, for example between the low generator voltage and the maximum no-load voltage accepted by the second battery 7, if for example the system is fitted with a DC/DC transformer 8 able to lower the voltage supplied by the second battery 7 to a value not exceeding the maximum voltage tolerated by the network.

In this case, for example, the second battery 7 could be charged at the maximum no-load voltage thereof from a network outside the vehicle, when the vehicle is stopped. This energy reserve is then used when the vehicle is being driven, supplementing it with a partial recharge of the battery at a high generator voltage when the vehicle is in regenerative deceleration mode.

If the DC/DC transformer is bi-directional, the second battery could also be charged at the maximum no-load voltage thereof by raising the voltage at the terminals of the second battery 7 in relation to the high generator voltage during regenerative deceleration phases.

For safety purposes and to prevent an even partial discharging of the first battery 4, the low generator voltage is set just above the maximum no-load voltage of the first battery 4.

The minimum no-load voltage of the second battery 7 is preferably lower than the low generator voltage such that, when the vehicle is in a driving mode in which the low generator voltage is set by the electronic management unit 10, the energy supplied by the generator automatically supplements the energy supplied by the second battery 7 when the voltage of this latter drops. This prevents the voltage of the second battery dropping below the minimum tolerated voltage V0mini_batt2.

Alternative embodiments in which the minimum no-load voltage of the second battery is greater than the low generator voltage could be carried out, in which case the electronic management unit 10 would have to set a high generator voltage before the voltage of the second battery 7 dropped below the minimum value thereof. In all cases, the minimum no-load voltage of the second battery 7 must be lower than the high generator voltage.

The low generator voltage is preferably less than the maximum no-load voltage of the second battery 7. It is also as close as possible to, and greater than, the maximum no-load voltage of the first battery, retaining a margin of deviation to ensure that the generator set to the low generator voltage remains above this minimum value V0max_batt1.

It is advantageous to use a second battery 7 in which the maximum no-load voltage V0max_batt2 is greater than the maximum voltage Vmax_réseau of the network 2, which enables the values of the low generator voltage and the high generator voltage to be selected from the entire voltage range between the maximum no-load voltage of the first battery V0max_batt1 and the maximum voltage accepted by the network Vmax_réseau.

This configuration is found in particular in a vehicle network 2 with a maximum acceptable voltage of around 15 to 16 volts in which the first battery 4 is a lead battery with a maximum no-load voltage of around 12.8 volts and the second battery 7 is a lithium-ion battery, for example a reconditioned lithium-ion battery previously used for electric vehicle propulsion. Such a reconditioned battery has for example a maximum no-load voltage of around 16.8 volts and a minimum acceptable no-load voltage of around 12 volts.

In addition to switching to a high generator voltage during vehicle deceleration phases, additional strategies may be used in the electronic management unit 10 to prevent excessive discharging of the second battery 7 if the regenerative deceleration phases are not frequent and/or long enough.

An intermediate generator voltage between the low generator voltage and the high generator voltage can then be set, i.e. necessarily greater than the low generator voltage and less than or equal to the high generator voltage. One or more intermediate voltages can then be set during certain driving phases suggesting that no deceleration will be occurring soon. These driving phases may include highway driving phases. One or more intermediate voltages may also be set for preprogrammed driving modes in the electronic management unit because the operating point of the engine for these driving modes consumes less fuel than other driving modes.

Switching to an intermediate generator voltage can also be triggered by the simultaneous detection of a given driving mode and of a state of charge less than or equal to a threshold state of charge of the second battery 7.

FIG. 3 shows an algorithm 1 that can be installed in the electronic management unit 10 of a power supply system according to the invention. At an initial instant 21, corresponding for example to the commissioning of the vehicle or the recommissioning thereof following a battery change, the electronic management unit 10 tests, at a step 22, whether the vehicle is in parking mode.

If it is, the electronic management unit 10 disconnects the second battery 7 from the network 2 using the switch 11, in a step 23, if this has not already been done.

It then tests, in a step 24, whether the voltage at the terminals of the second battery 7 has dropped below a voltage Vmin that may, for example, be equal to the minimum no-load voltage V0mini_batt2 of the second battery, or be slightly greater than this minimum no-load voltage.

If the measured voltage is less than the threshold voltage Vmin, the electronic management unit 10 displays a message warning the driver that he needs to change the second battery 7, in a step 25. If the voltage is greater than the threshold voltage Vmin, the electronic management unit returns to step 22.

If the test 22 indicates that the vehicle is no longer in parking configuration, the electronic management unit 10 tests, in a step 26, the health of the second battery 7. This health test may for example involve checking whether the number of charge/discharge cycles already undergone by the second battery 7 is less than a threshold number Nmax of charges and discharges, whether the different cells of the battery are sufficiently balanced, and whether the voltage at the terminals of the battery is greater than or equal to the threshold voltage Vmin.

If the response is negative, the electronic management unit 10 displays the warning message corresponding to step 25. If the result of the test 26 is positive, the electronic management unit performs a test 27 to determine whether the heat engine of the vehicle is active. If it is not, the electronic management unit 10 implements a strategy 28 to power the network 2 either from the first battery or from the second battery or from the two batteries jointly, before returning to step 22.

If the test 27 indicates that the heat engine of the vehicle is active, the electronic management unit tests, in a step 29, whether the vehicle is in a regenerative deceleration mode, i.e. whether the vehicle is in a deceleration mode enabling engine braking to be used, drawing some of the mechanical energy from the driveshaft to turn the generator. For this purpose, the setpoint at the pedal of the vehicle need simply correspond to an engine deceleration phase.

If the vehicle is in regenerative deceleration mode, the electronic management unit 10 sets the generator to a high generator voltage, for example 15 volts, in a step 31, and continues to loop around test 29 and control the high generator voltage 31, as long as the vehicle is decelerating.

If the vehicle is not in regenerative deceleration mode on completion of the test 29 step, the electronic management unit 10 sets the generator 3 to operate at the low generator voltage, for example at 13 volts, in a step 30.

After step 30, the electronic management unit 10 tests whether the vehicle and the second battery 7 are in a "forced charging" configuration. Such a forced charging configuration may for example occur when the voltage at the terminals of the second battery 7 drops beneath a threshold value $V_1$ and simultaneously a time counter Lt counting the time elapsed since the last deceleration exceeds a threshold $\Delta t_1$.

In this case, it can be assumed that the voltage of the second battery is beginning to become insufficient and that the driving mode detected is not a driving mode including sufficiently frequent decelerations.

If this test 32 reveals forced running configuration, the electronic management unit 10 sets, in a step 33, the generator 3 to a voltage Vgen_middle for example of 14.5 volts, and continues to set this forced charging mode as long as the recharge level of the battery being tested in a step 34 has not reached a minimum satisfactory level $SOC_{min}$.

This minimum charge level can for example be detected by a drop in the recharge current entering the second battery 7.

If the test in step 34 indicates that the recharge level of the second battery is sufficient, the electronic management unit 10 tests, in a step 35, the health of the second battery 7, for example by checking that the temperature of the battery does not exceed a maximum temperature $T_{max}$, by checking that the balance level between the different cells is sufficient, or failing this that this level still enables the different cells to be rebalanced, and by checking that the voltage V at the terminals of the second battery is greater than the threshold voltage $V_{min}$.

If the level of health detected in step 35 is insufficient, the electronic management unit 10 displays the warning message from step 25. Otherwise, the electronic management unit 10 tests, in a step 36, whether the different cells of the second battery 7 are sufficiently balanced. If this is the case, the electronic management unit returns to the test step 22 to check whether the vehicle has entered parking mode in the meantime.

Otherwise, the electronic management unit triggers a balancing of the cells in a step 37 and also returns to step 22.

The subject matter of the invention is not limited to the example embodiments described and may be subject to numerous variations, both in terms of the arrangement of the different elements of the system 1, the operating algorithms installed in the electronic management unit 10 and/or the choice of battery types or other types of accumulators.

The low voltage and the high-voltage set at the terminals of the second battery 7 may be obtained either by adjusting the voltage supplied by the generator to two different levels, or by raising the voltage at the terminals of the second battery using a DC/DC transformer. The high voltage may also be obtained by simultaneously raising the setpoint voltage at the terminals of the generator and transforming this voltage, using the DC/DC transformer, into an even higher voltage at the terminals of the second battery.

The operating algorithm, an example of which is given in FIG. 3, can accommodate numerous variants, in particular with regard to the succession of the different tests to determine the generator voltage to be set at a given instant, or in the definition of one or more forced charging modes.

These forced charging modes may be defined with different generator voltages Vgen_middle depending on the mode. Different forced charging modes may for example be defined according to the different charge level conditions of the second battery and different driving-type and/or operating-point conditions of the engine detected.

The electrical accumulators referred to as first and second battery may be electrochemical accumulator batteries, for example a first lead battery and a second lithium-ion battery. Other types of lithium battery other than lithium-ion batteries, other electrochemical batteries or even one or more supercapacitors may be used for the second battery.

The invention may be used for a power supply system of a vehicle driven by a heat engine. It may also be used for an electrical power supply system of a hybrid electric vehicle. In this latter case, a lithium battery may for example be used as the first battery to start the vehicle and occasionally to drive the vehicle, and a supercapacitor may for example be used as the second battery to accumulate energy during deceleration phases. Consequently, the term "electrical accumulation battery" should be understood in its broadest sense in this application since it covers supercapacitor storage systems.

The system according to the invention makes it possible to reduce the overall fuel consumption of the vehicle, to prolong the lifetime of the first battery, and—if a reconditioned lithium battery is used as the second battery—to reduce the cost and ecological footprint of the system.

It should be noted that the concept of using two batteries for different purposes can be extended to more than two batteries. Indeed, it is possible to use a third battery connected to the on-board network by means of a DC/DC converter and a switch, this switch being closed in "parking" mode, i.e. when the engine is stopped, to provide the electrical energy required by the electrical devices in the on-board network. Advantageously, this third battery comprises modules recovered from an electric vehicle traction battery, uses the best efficiency points of the engine and of the generator for recharging (for example when decelerating, in the same way as the second lithium battery), and has a complimentary recharging system such as a solar panel.

Moreover, the first lead battery used for starting the vehicle may be connected to the on-board network by means of a switch, enabling the use thereof to be further specialized: this switch is for example closed only when starting, and at the best efficiency points of the engine and of the generator when the state of charge thereof is below a given threshold.

It should be noted that use of a switch between firstly a first battery and the on-board network and secondly a second battery and the on-board network enables these two batteries to be identical lead batteries connected in parallel with the generator without an intermediate DC/DC converter, allocating them a specific role (one for starting, the other for powering the on-board network) and recharging them at the best efficiency points of the engine and of the generator.

The invention claimed is:

1. An electrical power supply system of a vehicle, comprising:
   a direct-current network, of at least one electrically powered device, that can be powered by a range of voltages not exceeding a maximum network voltage;
   a first electrical accumulation battery connected to the network, and having a first maximum no-load voltage that is less than the maximum network voltage;
   a second electrical accumulation battery connected to the network, having a second maximum no-load voltage that is greater than the maximum network voltage and greater than the maximum no-load voltage of the first battery, and an acceptable minimum no-load voltage that is less than the maximum network voltage, an adjustable generator connected to the network configured to supply electrical energy to the second battery with a setpoint voltage adjustable to different setpoint values; and an electronic management unit configured to set the adjustable generator, when the vehicle is being driven, successively to at least two different setpoint voltages, a low generator voltage and a high generator voltage, wherein the low generator voltage is greater than the acceptable minimum no-load voltage of the second battery, and the high generator voltage is lower than the second maximum no-load voltage of the second battery.

2. The system as claimed in claim 1, wherein the first battery is a lead battery and the second battery is a lithium battery.

3. The system as claimed in claim 1, wherein the electronic management unit is configured to open a switch of the second battery when an engine of the vehicle is stopped and, if the voltage of the first battery drops beneath a first threshold and simultaneously the voltage of the second battery is above a second threshold, to close this switch for a predetermined period of time before the vehicle is next started.

4. A management method of a motor vehicle having an electrical supply system having a direct-current network, of at least one electrically powered device, powered by a range of voltages not exceeding a maximum network voltage, a first electrical accumulation battery connected to the network and having a first maximum no-load voltage that is less than the maximum network voltage, and a second electrical accumulation battery connected to the network having a second maximum no-load voltage that is greater than the maximum network voltage an greater than the maximum no-load voltage of the first battery and an acceptable minimum no-load voltage that is less than the maximum network voltage, the method comprising:

supplying, via an adjustable generator connected to the network, an electrical energy to the second battery with a setpoint voltage adjustable to different setpoint values;

setting, via an electronic management unit, the adjustable generator, when the vehicle is being driven, successively to at least two different setpoint voltages, a low generator voltage and a high generator voltage, wherein the low generator voltage is greater than the acceptable minimum no-load voltage of the second battery, and the high generator voltage is lower than the second maximum no-load voltage of the second battery;

selecting, via the electronic management unit, the low generator voltage for initial vehicle driving phases; and selecting, via the electronic management unit, the high generator voltage for a subsequent vehicle driving phases.

5. The method as claimed in claim 4, wherein the high generator voltage is set when the vehicle is in a regenerative deceleration phase, and the low generator voltage is set when the vehicle is in an engine acceleration phase.

6. The method as claimed in claim 4, wherein an intermediate generator voltage, greater than the low generator voltage and less than the high generator voltage, is set when a charge level of the second battery drops below a threshold charge, and/or when a specific driving mode of the vehicle other than deceleration is detected, and/or when the current supplied by the second battery to the network passes a given threshold.

7. The system as claimed in claim 1, further comprising:
solar panels connected to the second battery to provide energy to the network.

8. The system as claimed in claim 1, wherein the acceptable minimum no-load voltage of the second accumulation battery is greater than a first minimum no-load voltage of the first battery.

9. The system as claimed n claim 1, wherein the low generator voltage is less than or equal to 1.05 times the maximum no-load voltage of the first battery.

10. The system as claimed in claim 1, wherein the low generator voltage is less than or equal to 1.035 times the maximum no-load voltage of the first battery.

11. The system as claimed in claim 1, further comprising a DC/DC voltage transformer configured to lower the voltage supplied by the second battery to the network.

12. The system as claimed in claim 11, wherein the voltage transformer is bi-directional and configured to power the second battery at a voltage greater than the maximum network voltage when the generator is supplying a current below the high generator voltage.

13. The system as claimed in claim 1, wherein the low generator voltage is higher than the first maximum no-load voltage of the first battery.

14. The method as claimed in claim 4, wherein the low generator voltage is higher than the first maximum no-load voltage of the first battery.

* * * * *